United States Patent
Hopsecger

(12) 
(10) Patent No.: US 6,298,393 B1
(45) Date of Patent: Oct. 2, 2001

(54) INDUSTRIAL CONTROL SYSTEMS HAVING INPUT/OUTPUT CIRCUITS WITH PROGRAMMABLE INPUT/OUTPUT CHARACTERISTICS

(75) Inventor: Edward C. Hopsecger, Mentor, OH (US)

(73) Assignee: Rockwell Technologies, LLC, Thousand Oaks, CA (US)

( * ) Notice: Subject to any disclaimer, the term of this patent is extended or adjusted under 35 U.S.C. 154(b) by 0 days.

(21) Appl. No.: 09/165,014

(22) Filed: Sep. 30, 1998

(51) Int. Cl.[7] .................................................. G06F 13/10
(52) U.S. Cl. ................................. 710/8; 710/260; 714/43
(58) Field of Search ............................. 370/402; 371/11; 711/141; 710/260, 8; 714/43; 700/121

(56) References Cited

U.S. PATENT DOCUMENTS

| | | |
|---|---|---|
| 4,593,380 | 6/1986 | Kocher et al. . |
| 4,628,397 | 12/1986 | Gareis et al. . |
| 4,771,403 | 9/1988 | Maskovyak et al. . |
| 4,951,250 | 8/1990 | Cruickshank et al. . |
| 5,107,146 | 4/1992 | El-Ayat . |
| 5,196,740 | 3/1993 | Austin . |
| 5,274,767 | 12/1993 | Maskovyak . |
| 5,274,781 | 12/1993 | Gibart . |
| 5,325,518 * | 6/1994 | Bianchini, Jr. ........................ 395/575 |
| 5,327,425 * | 7/1994 | Niwa et al. ........................ 370/85.1 |
| 5,386,573 * | 1/1995 | Okamoto ................................ 395/725 |
| 5,432,465 | 7/1995 | Hsi-Jung et al. . |
| 5,440,695 | 8/1995 | Janke et al. . |
| 5,537,653 * | 7/1996 | Bianchini, Jr. ................... 395/183.01 |
| 5,563,526 | 10/1996 | Hastings et al. . |
| 5,586,251 * | 12/1996 | Coleman et al. ................ 395/183.19 |
| 5,701,515 | 12/1997 | Gradeler . |
| 5,838,177 | 11/1998 | Keeth . |
| 5,970,069 * | 10/1999 | Kumar et al. ......................... 370/402 |
| 5,999,610 * | 12/1999 | Lin et al. .............................. 379/201 |
| 6,166,593 | 12/2000 | Ganzelmi et al. . |

OTHER PUBLICATIONS 9-pg. document from GE Fanuc Automation website, containing articles on "Genius® Distributed I/O System", "PLC Products" ("I/O Products", "Field Control™"), "Cimplicity® Products" ("Cimplicity Products"), and PLC Products ("Cimplicity ® PC Control").

* cited by examiner

*Primary Examiner*—Thomas Lee
*Assistant Examiner*—Thuan Du
(74) *Attorney, Agent, or Firm*—David G. Luettgen; A. M. Gerasimow

(57) ABSTRACT

A programmable analog I/O circuit for use in an industrial control system has a first mode of operation as an input circuit and a second mode of operation as an output circuit. In the first mode of operation, a device-side I/O terminal is adapted for receiving an analog input status signal from an analog input device. In the second mode of operation, the device-side I/O terminal is adapted for transmitting an analog output control signal to an analog output device. According to another aspect, a programmable I/O circuit that drives an output device in an industrial control system comprises a plurality of configurable gain stages and a plurality of programmable isolating links. The plurality of programmable isolating links are coupled to the plurality of configurable gain stages and are programmable to determine a series or parallel arrangement of the plurality of configurable gain stages. The output control signal produced by the parallel arrangement is a high current, low voltage output signal as compared to the output control signal produced by the series arrangement. According to another aspect, an integrated circuit fabricated on a single semiconductor chip comprises an I/O interface, a control/logic circuit, and a communication interface. The integrated circuit may be advantageously used to provide a highly distributed industrial control system in which control is distributed all the way to the device level.

17 Claims, 11 Drawing Sheets

INDUSTRIAL CONTROL SYSTEMS HAVING INPUT/OUTPUT CIRCUITS WITH PROGRAMMABLE INPUT/OUTPUT CHARACTERISTICS

BACKGROUND OF THE INVENTION

1. Field of the Invention

This invention relates to input/output circuits for industrial control systems. In particular, this invention relates to industrial control systems having input/output circuits with programmable input/output characteristics.

2. Description of Related Art

Industrial control systems are widely used for controlling industrial processes. Modern industrial control systems typically comprise a microprocessor-based controller that controls the output status of a plurality of output devices based on the input status of a plurality of input devices. In a widely used arrangement, the microprocessor-based controller is provided in the form of a rack-mounted programmable controller processor module that cooperates with one or more rack-mounted input/output (I/O) modules to communicate with the input and output devices.

With respect to the output devices, typically, the processor module provides the I/O module with a digital representation of the desired status of an output device. For a digital output device (e.g., a solenoid, valve, relay, and so on), the digital representation simply indicates whether the output device should be "on" or "off" . For an analog output device (e.g., a heater element in a temperature control system), the digital representation indicates not only whether the output device should be turned on, but also the extent to which the output device should be turned on.

An I/O module comprises an output circuit that connects the I/O module to the output device. In general, the purpose of an output circuit is to provide signal conditioning. The signal conditioning generally involves converting a digital or analog representation of the desired output status of an output device to an output control signal that is capable of driving the output device in the desired manner. For a digital output device, the output circuit converts the low power digital signal indicative of the desired on/off status into a digital output control signal that has the voltage and current characteristics necessary to drive the digital output device.

For an analog output device, the I/O module typically includes a digital-to-analog (D/A) converter that converts the digital representation of the desired output status into an analog representation of the desired output status. The output circuit then converts the analog representation into an analog output control signal having the signal characteristics expected by the analog output device. For example, some output devices are controlled by controlling the current that flows through the output device. Therefore, it is necessary to produce an amount of output current that varies in accordance with the amount of the analog voltage that is produced by the D/A converter. Additionally, it is often necessary to provide level shifting and/or scaling. For example, the D/A converter may be a monopolar device that outputs a voltage which varies between +1 volts and +4 volts, whereas the output device may be a bipolar device that expects an analog output control signal which varies between −10 volts and +10 volts. Therefore, the output circuit provides the necessary level shifting and scaling to convert the 1–4 volt signal to a ±10 volt signal.

Likewise, for the input devices, input circuits are provided that provide signal conditioning for similar reasons. In particular, an analog input device produces an analog input status signal that indicates the input status of the input device. The analog input status signal usually must be converted to another signal format that can be digitized using an analog-to-digital (AID) converter, since the A/D converter expects an input voltage signal that varies within a fixed voltage range determined by the A/D converter. Depending on the input device, the analog input status signal may vary between a variety of different possible ranges, and may also be a current signal instead of a voltage signal. Thus, it may be necessary to convert the analog input status signal from a current signal to a voltage signal and/or to perform level shifting and scaling to the analog input status signal so that it may be digitized by the AID converter.

Typically, an I/O module is provided as a multi-channel device, i.e., the I/O module has multiple output channels and/or multiple input channels. For example, I/O modules are sold that have four output channels and eight input channels. In a multiple channel device, one output circuit is provided for each one of the output devices and one input circuit is provided for each one of the input devices. Thus, in the above example, four output circuits and eight input circuits are provided.

Generally, existing I/O circuits are of limited flexibility. For example, analog I/O modules have a fixed number of input channels and a fixed number of output channels. Therefore, an I/O module with four output channels and eight input channels cannot be reconfigured so as to have six output channels and six input channels. It would be highly advantageous to provide an I/O module that is reconfigurable so that the relative number of output channels and input channels may be varied. It would be even more advantageous to provide an I/O module in the manner just described, and wherein each I/O circuit always uses the same device-side I/O terminal to connect with I/O devices, regardless whether the I/O device is an input device or an output device.

Additionally, existing I/O circuits are limited in their ability to switch between providing a high current/low voltage output signal and low current/high voltage output signal. While a limited amount of flexibility has been achieved to the extent that selectable voltage and current ranges have been achieved, flexibility has still been limited to the extent that an efficient way has not been provided to reconfigure an output circuit between providing a high current/low voltage output signal and a low current/high voltage output signal. The ability to reconfigure an I/O module in this manner would be highly advantageous.

BRIEF SUMMARY OF THE INVENTION

The present invention overcomes these drawbacks of the prior art. According to one aspect of the invention, the present invention provides a programmable analog I/O circuit for use in an industrial control system. The programmable I/O circuit has first and second modes of operation. The first mode of operation is as an input circuit, and the second mode of operation is as an output circuit. The programmable analog I/O circuit comprises a device-side I/O terminal and signal conditioning circuitry which is coupled to the device-side I/O terminal. In the first mode of operation, the device-side I/O terminal is adapted for receiving an analog input status signal from an analog input device. The analog input status signal indicates an input status of the analog input device and is received as an input by the signal conditioning circuitry. In the second mode of operation, the device-side I/O terminal is adapted for transmitting an analog output control signal to an analog output device. The analog output control signal indicates a desired output status of the analog output device and is produced by the signal conditioning circuitry as an output.

Advantageously, the I/O circuit may be used both as an input circuit and as an output circuit. Moreover, it is possible to achieve these different modes of operation while using the same device-side terminal to connect the I/O circuit to a user-provided I/O device, regardless whether the I/O device is an input device or an output device. As a result, the terminal block used in conjunction with the I/O circuit is drastically simplified, because it is not necessary to provide two different device-side terminals as well as a common terminal for each I/O channel.

According to another aspect of the present invention, the present invention provides a programmable I/O circuit for use in an industrial control system. The programmable I/O circuit comprises a plurality of configurable gain stages and a plurality of programmable isolating links. The plurality of programmable isolating links are coupled to the plurality of configurable gain stages and are programmable to determine an arrangement of the plurality of configurable gain stages.

The plurality of configurable gain stages are adapted for being configured in first and second arrangements. In the first arrangement, the plurality of configurable gain stages are arranged in series so as to provide a first output control signal to an output device. In the second arrangement, the plurality of configurable gain stages are arranged in parallel so as to provide a second output control signal to an output device. The first output control signal is a high current, low voltage output signal as compared to the second output control signal and, conversely, the second output control signal is a low current, high voltage output signal as compared to the first output control signal. Advantageously, therefore, the I/O circuit has the ability to provide both a high current/low voltage output signal and a low current/high voltage output signal.

According to another aspect of the present invention, the present invention provides an integrated circuit fabricated on a single semiconductor chip which comprises an I/O interface, a control/logic circuit, and a communication interface. The I/O interface is programmable and is coupled to an output device. The control/logic circuit is also programmable and controls the I/O interface to thereby control the output device. The communication interface is adapted for being connected to a communication network (1) to receive information usable to program the I/O interface and the control/logic circuit, and (2) to permit the control/logic circuit to control the I/O interface on the basis of I/O status information received from other I/O devices by way of the communication network. Advantageously, the integrated circuit may be used to provide a highly distributed industrial control system in which control is distributed all the way to the device level.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and which.

DETAILED DESCRIPTION OF THE PREFERRED EMBODIMENTS

Figure 1:
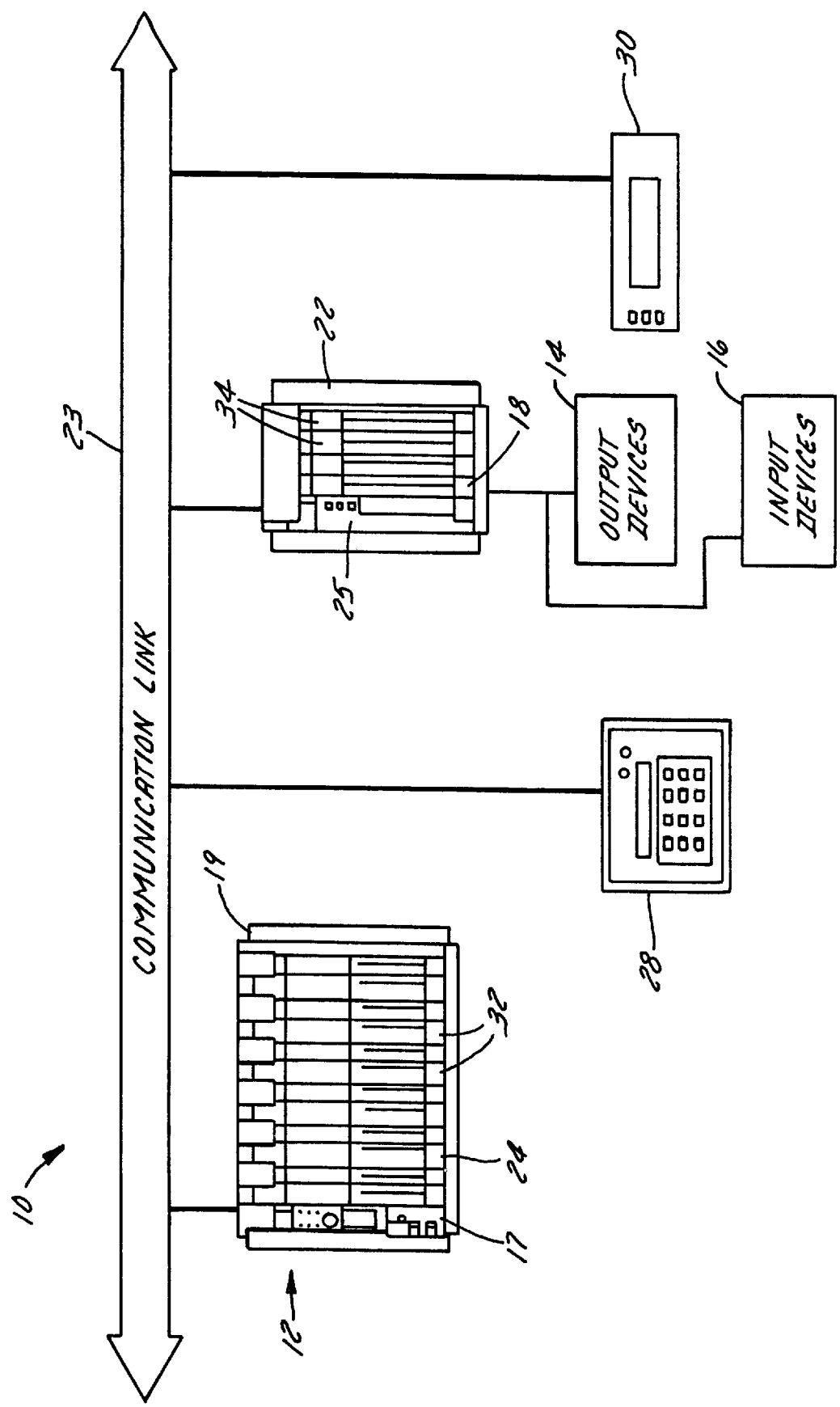
FIG. 1 is an industrial control system that utilizes programmable I/O circuits according to amn embodiment of the present invention.

Referring now to FIG. 1, an industrial control system 10 is illustrated. The industrial control system 10 utilizes programmable input/output (I/O) circuits that are described in greater detail below. It should be noted that the industrial control system 10 is merely one example of an industrial control system that could utilize the present invention, and that other systems are also possible.

The industrial control system 10 comprises a programmable control system 12 that controls the output status of a plurality of output devices 14 based on the input status of a plurality of input devices 16. To this end, the programmable control system 12 has a microprocessor-based processor module 17 that executes a stored control program which defines the manner in which the output devices 14 are controlled.

The processor module 17 communicates with the I/O devices 14 and 16 by way of an I/O module 18. In particular, the processor module 17 transmits a digital representation of the desired output status of the output devices 14 to the I/O module 18. Based on the digital representation of the desired output status of the output devices 14, the I/O module 18 produces an output control signal that is capable of driving the output devices 14 in the desired manner. Likewise, the processor module 17 receives a digital representation of the input status of the input devices 16 from the I/O module 18. The I/O module 18 produces the digital representation of the input status of the input devices 16 based on input status signals received from the input devices 16.

In the illustrated embodiment, the processor module 17 is disposed in a rack 19 and the I/O module 18 is disposed in a separate rack 22, and communication between the processor module 17 and the I/O module 18 occurs by way of a Remote I/O network or other communication link 23. To this end, the industrial control system 10 further comprises a scanner module 24 and an adapter module 25. The scanner module 24 is mounted in the same rack 19 as the processor module 17 and communication between the two modules occurs by way of a common backplane that is incorporated into the rack 19. Likewise, the adapter module 25 is mounted in the same rack as the I/O module 18 and communication between the two occurs by way of a common backplane that is incorporated into the rack 22. Thus, information is transmitted from the processor module 17 to the I/O module 18 through the backplane of the rack 19, through the scanner module 24, through the communication link 23, through the adapter module 25, and through the backplane of the rack 22. Information is transmitted from the I/O module 18 to the processor module 17 by way of the opposite path.

The industrial control system 10 also comprises other features such as an operator interface 28 and a message display 30. The operator interface 28 and message display 30 facilitate human interaction with the industrial control system 10. Additionally, the rack 19 contains a plurality of other modules 32. The other modules 32 could include, for example, one or more Ethernet modules, Data Highway or Data Highway Plus modules, and/or a plurality of other types of modules, all of which plug into the same common backplane. Finally, the I/O rack 22 contains a plurality of additional I/O modules 34.

Of course, numerous other arrangements are possible. For example, the I/O module 18 could be disposed in the same rack 19 as the processor module 17. Also, an industrial control system could be implemented without using rack-mounted modules.

Figure 2:
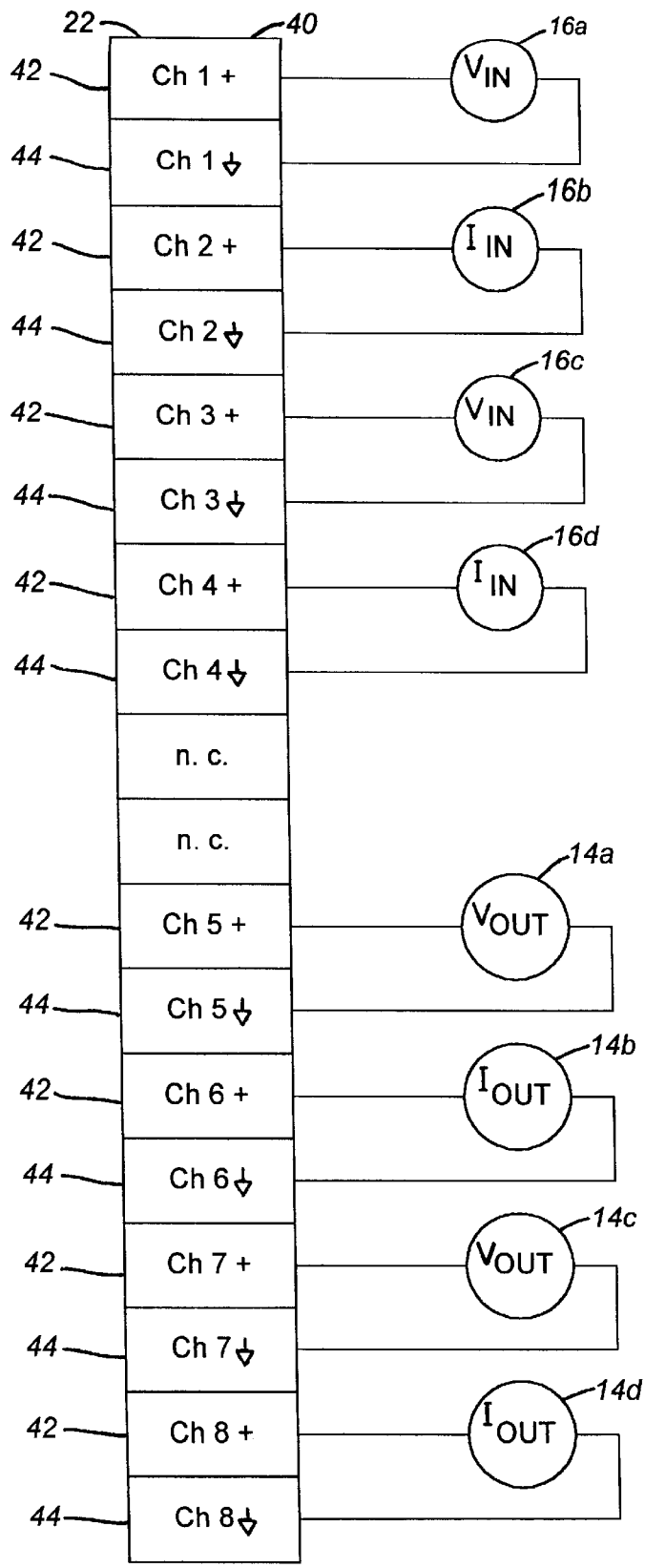
FIG. 2 is a diagram of a terminal block of an I/O module used in the industrial control system of FIG. 1.

Referring now also to FIG. 2, a terminal block 40 of the I/O module 18 is illustrated. Based on the terminal block 40, it is apparent that the I/O module 18 comprises eight I/O channels, appropriately labeled "Ch 1" through "Ch 8."

The terminal block 40 couples the I/O module 18 to four of the output devices 14 shown in FIG. 1. The four output devices are more specifically designated 14a–14d in FIG. 2. Assuming the output devices 14a–14d are analog output devices, they are controlled by an analog output control signal that varies between a minimum output value and a maximum output value. The output status of each of the output devices 14a and 14c is controlled by varying the voltage level of the respective analog output control signal. The output status of each of the output devices 14b and 14d is controlled by varying the current level of the respective analog output control signal.

The terminal block 40 also couples the I/O module 18 to four of the input devices 16 shown in FIG. 1. The four input devices are more specifically designated 16a–16d in FIG. 2. Assuming the input devices 16a–16d are analog output devices, each of the input devices 16a–16d transmits an analog input status signal that varies between a minimum input value and a maximum input value, depending on the status of the input device. The input status of each of the input devices 16a and 16c is indicated by the voltage level of the respective analog input status signal. The input status of each of the input devices 16b and 16d is indicated by the current level of the respective analog input status signal.

The output devices 14a–14d and the input devices 16a–16d are coupled to the I/O module by way of respective terminals 42 and 44. The terminals 42 are referred to as device-side I/O terminals (as opposed to the control-side I/O terminals discussed below). The I/O terminal block includes device-side I/O terminals for each of the output devices 14a–14d and for each of the input devices 16a–16d. The terminals 44 are common terminals. Although preferably a separate common terminal is provided for each of the I/O devices 14a–14d and 16a–16d, it would also be possible to provide only a single common terminal. It should also be noted that the output devices 14a–14d and the input devices 16a–16d could be digital devices, in which case the output control signals and input status signals would be binary in nature.

The I/O module 18 transmits the analog output control signals to the output devices 14 and receives the analog input status signals from the input devices 16. To this end, the I/O module 18 includes digital-to-analog (D/A) converters (not illustrated) that convert digital representations of desired output status received from the processor module 17 by way of the communication link 23 to signals that are used as inputs to I/O circuits. The I/O circuits use these inputs to produce analog output control signals to control the output devices 14. Similarly, I/O module 18 also includes analog-to-digital A/D converters (not illustrated) that convert outputs of I/O circuits into digital representations of the input status that can be transmitted by way of the communication link 23 to the processor module 17. The outputs of the I/O circuits are produced based upon the analog input status signals received from the input devices 16.

Figure 3A:
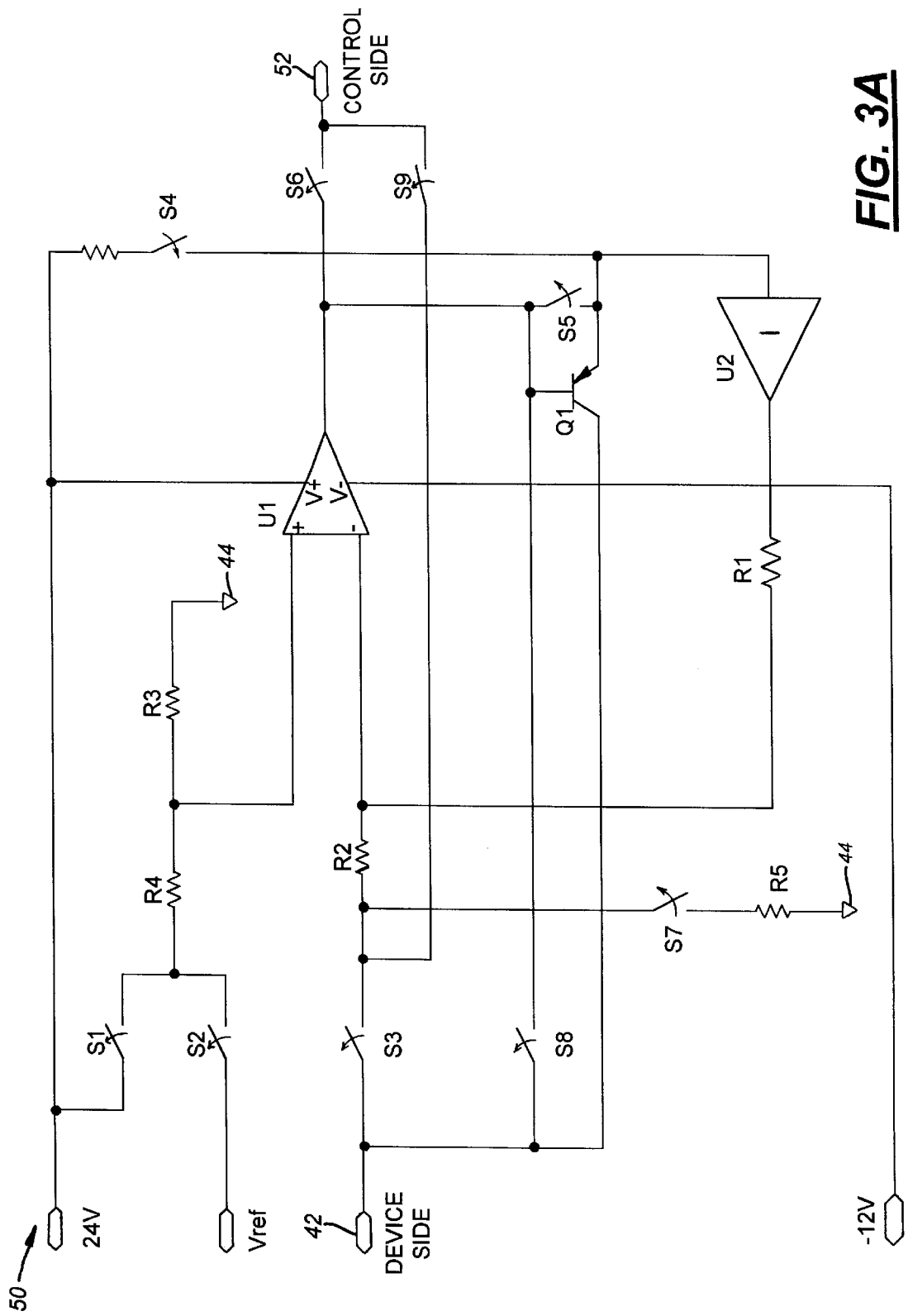
FIG. 3A is a detailed schematic diagram of a programmable I/O circuit that may be used in conjunction with the industrial control system of FIG. 1.

Referring now also to FIG. 3A, an I/O circuit 50 that is used in the I/O module 18 is illustrated. One of the I/O circuits 50 is used for each one of the eight I/O channels of the I/O module. Notably, the I/O circuit 50 is the same for each of the eight channels even though some of the channels are input channels and some of the channels are output channels. The I/O circuit 50 is thus capable of being programmed for use as either an input circuit or as an output circuit.

As shown in FIG. 3A, the I/O circuit 50 comprises a plurality resistors R1–R6, an operational amplifier (op-amp) U1, a transistor Q1, and a unity gain amplifier U2 and a plurality of switches S1–S9 which may, for example, be MOS transistors, microelectromechanical switches (commonly known as "MEMS"), or mechanical relays. These elements are functionally disposed between the device-side terminal 42 and a control-side terminal 52. As previously indicated, the device-side terminal 42 electrically connects the I/O circuit 50 to an input device or an output device. Either way, therefore, the device-side terminal 42 is the terminal through which signals travel between the I/O devices 14 and 16 and the I/O circuit 50, regardless whether the I/O circuit 50 is configured as input circuit or as an output circuit.

The control-side terminal 52 is coupled either to an A/D converter or to a D/A converter. The I/O module 18 preferably comprises one A/D converter and one D/A converter for each of its eight channels. Whether the 110 circuit 50 is coupled to the A/D converter or to the D/A converter depends on whether the I/O circuit 50 is configured as an input circuit or an output circuit. Either way, however, the control-side terminal 52 is the terminal through which signals travel between the processor module 17 and the I/O circuit 50, regardless whether the I/O circuit 50 is configured as input circuit or as an output circuit. The control-side terminal 52 and the device-side terminal 42 are therefore similar in this regard.

The control-side terminal 52 couples the I/O circuit 50 to the processor module 17 by way of the I/O module 18, the backplane of the rack 22, the adapter module 25, the communication link 23, the scanner module 24, and the backplane of the rack 18. In this regard, it may be noted that the digital representation of the desired output status for each of the output devices 14 undergoes numerous format changes as this information is transmitted from the processor module 17 to the I/O circuit 50. Likewise, the digital representation of the input status for each of the input devices 16 undergoes numerous format changes as this information is transmitted from the I/O circuit 50 to the processor module 17.

Figure 3B:
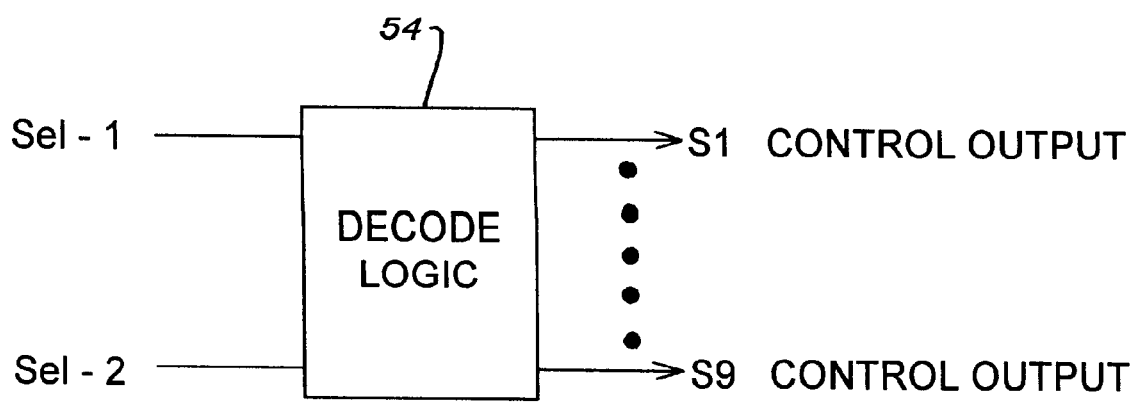
FIG. 3B is decoder logic that is used to control switches in the programmable I/O circuit of FIG. 3A.

Referring now also to FIG. 3B, the I/O circuit 50 has four different modes of operation. The mode of operation of the circuit 50 is determined using decode logic circuitry 54. The decode logic circuitry 54 has two binary inputs (sel-1 and sel-2) and nine binary outputs (S1–S9 control outputs) which control the opened/closed status of the switches S1–S9. The decode logic circuitry 54 may therefore be a 2 bit×9 bit decoder. Alternatively, since many of the switches have the same opened/closed status in the different modes of operations, a 2 bit×6 bit decoder could be used with some of the outputs being shared by multiple switches. Also, the output that controls the switch S9 could also be used to select between an A/D converter or a D/A converter which both are connected to the control-side terminal 52, since the position of the switch S9 is indicative of whether the I/O circuit is being used as an input circuit or as an output circuit (see Table 1 below).

The binary inputs sel-1 and sel-2 may be received, for example, from a pair of hardwired switches (e.g. DIP switches) mounted on the circuit board that is used to construct the I/O circuit 50. Alternatively, the binary inputs sel-1 and sel-2 may be received from the processor module 17. This would allow the processor module to program the mode of operation of the I/O circuit 50 based on parameters assigned to the I/O circuit 50 in a user-written control program executed by the processor module 17.

The positions of the switches S1–S9 can be changed at any time whenever it is desired to change the operating mode of the I/O circuit 50. Table 1 shows the opened/closed states of the switches S1–S9 in the four different modes of operation of the circuit 50:

TABLE 1

Figure 4A:
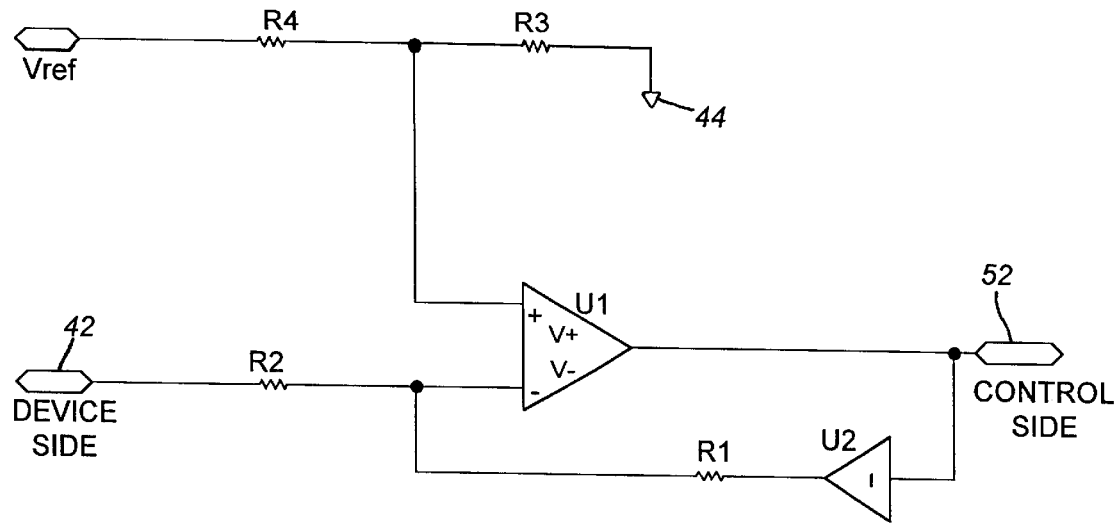
FIG. 4A–4D are schematic diagrams of the programmable I/O circuit of FIG. 3A simplified according to the mode of operation illustrated.

The opened/closed states of the switches S1–S9 in the four different modes of operation of the circuit 50 shown in FIGS. 4A–AD.

| Mode | S1/S4 | S2/S5 | S3/S6 | S7 | S8 | S9 |
|---|---|---|---|---|---|---|
| Input Voltage (FIG. 4A) | O | C | C | O | O | O |
| Input Current (FIG. 4B) | O | C | C | C | O | O |
| Output Voltage (FIG. 4C) | O | C | O | O | C | C |
| Output Current (FIG. 4D) | C | O | O | O | O | C |

The opened/closed states of the switches S1–S9 in the four different modes of operation of the circuit 50 shown in FIGS. 4A–AD.

The different modes of operation will now be described in greater detail in conjunction with FIGS. 4A–4D. FIGS. 4A–4D show the same schematic as FIG. 3, however, the schematic of FIG. 3 has been simplified in accordance with whether the switches S1–S9 are opened or closed. Thus, FIGS. 4A–4D do not show the switches S1–S9 but instead show the circuit that results when the switches S1–S9 are in the position indicated by Table 1.

Referring first to FIG. 4A, the circuit schematic that is applicable when the analog I/O circuit 50 operates as an input circuit that receives an input voltage is illustrated. This mode of operation is used in conjunction with the input devices 16a and 16c. The input status of the input devices 16a and 16c is indicated by the voltage level of the analog input status signal received at the device-side terminal 42. As shown in FIG. 4A, the device-side terminal 42 is coupled to an input of the op-amp U1 by way of resistor R2. Thus, the op-amp U1 receives the analog input status signal as an input. The other of the inputs is a reference voltage input $V_{ref}$. The reference voltage permits level shifting.

The control-side terminal 52 receives the output of the op-amp U1. The output of the op-amp U1 is related to the inputs $V_{in}$ and $V_{ref}$ in the following manner:

$$V_c = V_{ref} \frac{R_3(R_1 + R_2)}{R_2(R_3 + R_4)} - V_{in} \frac{R_1}{R_2} \quad (1)$$

where $V_{in}$ is the analog input status signal received as an input from one of the input devices 16a and 16c, $V_{ref}$ is a fixed reference voltage, $V_c$ is a voltage signal that is produced as an output at the control-side terminal 52, and R1–R4 are the resistance values of the resistors R1–R4. From Eq. (1), it is seen that the output voltage is scaled by the term $$\frac{R_1}{R_2}$$

and is level shifted by the term $$V_{ref} \frac{R_3(R_1 + R_2)}{R_2(R_3 + R_4)}.$$

For purposes of determining the input/output characteristics of the I/O circuit 50, the unity gain amplifier U2 may be viewed as being short circuited. As detailed below, the unity gain amplifier U2 prevents loading from adversely affecting the output of the op-amp U1 during the mode of operation illustrated in FIG. 4D.

Figure 4B:
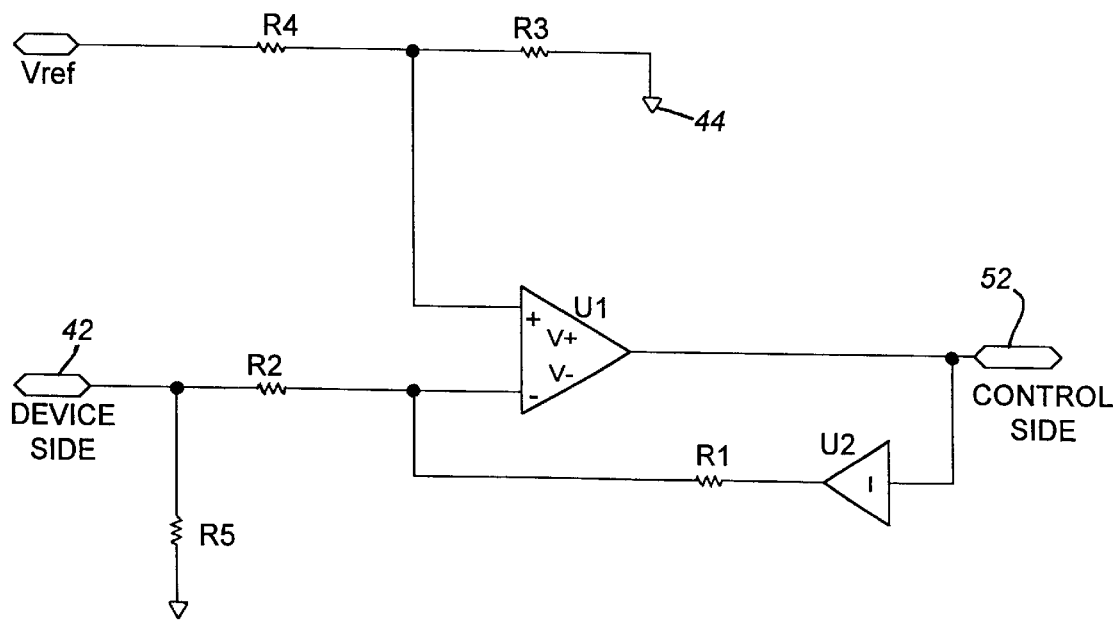

Referring next to FIG. 4B, the circuit schematic that is applicable when the analog I/O circuit 50 operates as an input circuit that receives an input current is illustrated. This mode of operation is used in conjunction with the input devices 16b and 16d. The input status of the input devices 16a and 16c is indicated by the current level of the analog input status signal received at the device-side terminal 42. Again, the device-side terminal 42 is one of the inputs to the op-amp U1.

The control-side terminal 52 receives the output of the op-amp U1. The output of the op-amp U1 is related to the inputs $I_{in}$ and $V_{ref}$ in the following manner:

$$V_c = V_{ref} \frac{R_3(R_1 + R_2)}{R_2(R_3 + R_4)} - I_{in} R_5 \frac{R_1}{R_2} \quad (2)$$

where $I_{in}$ is the input status signal received as an input from one of the input devices 16b and 16d. From Eq. (2), it is seen that the output current is converted to a voltage, is scaled by the term $$R_5 \frac{R_1}{R_2}$$

and is level shifted by the term $$V_{ref} \frac{R_3(R_1 + R_2)}{R_2(R_3 + R_4)}.$$

Figure 4C:
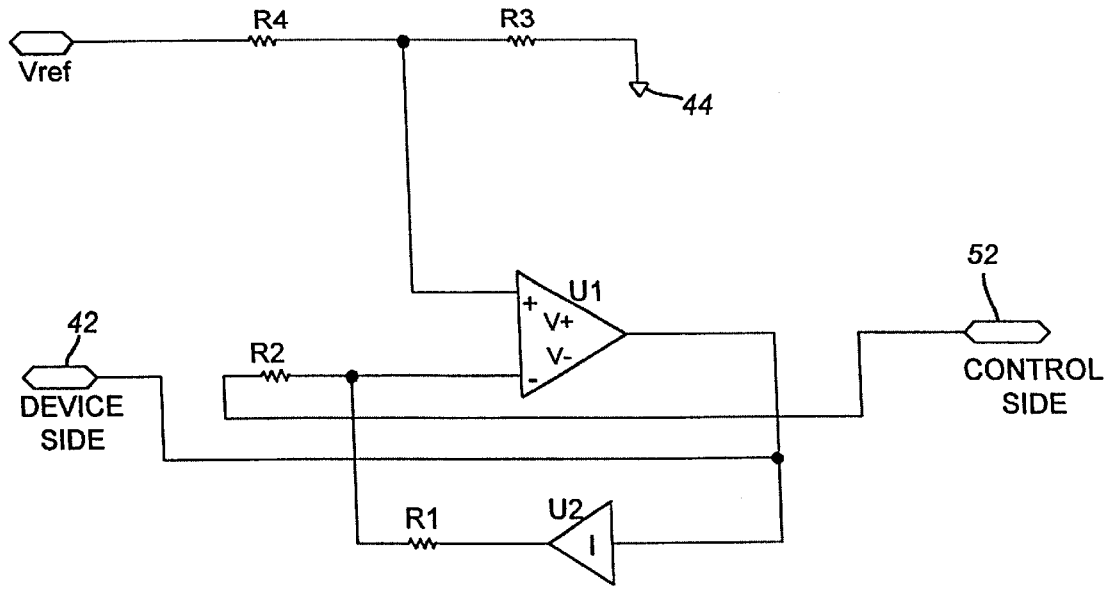

Referring next to FIG. 4C, the circuit schematic that is applicable when the analog I/O circuit 50 operates as an output circuit that produces an output voltage is illustrated. This mode of operation is used in conjunction with the output devices 14a and 14c. The desired output status of the output devices 14a and 14c is indicated by the voltage level of the signal received at the control-side terminal 52. As shown in FIG. 4C, the control-side terminal 52 is one of the inputs to the op-amp U1. Again, the other of the inputs is a reference voltage input $V_{ref}$.

The device-side terminal 52 receives the output of the op-amp U1. The output of the op-amp U1 is related to the inputs $V_c$ and Vref in the following manner:

$$V_{out} = V_{ref}\frac{R_3(R_1 + R_2)}{R_2(R_3 + R_4)} - V_c\frac{R_1}{R_2} \quad (3)$$

where $V_c$ is a voltage signal received as an input from at the control-side terminal 52, $V_{ref}$ is a fixed reference voltage, and $V_{out}$ is the analog output control signal that is produced as an output of the op-amp U1 and that is transmitted to one of the output devices 14a and 14c. From Eq. (3), it is seen that the output voltage is scaled by the term $$\frac{R_1}{R_2}$$

and is level shifted by the term $$V_{ref}\frac{R_3(R_1 + R_2)}{R_2(R_3 + R_4)}.$$

Figure 4D:
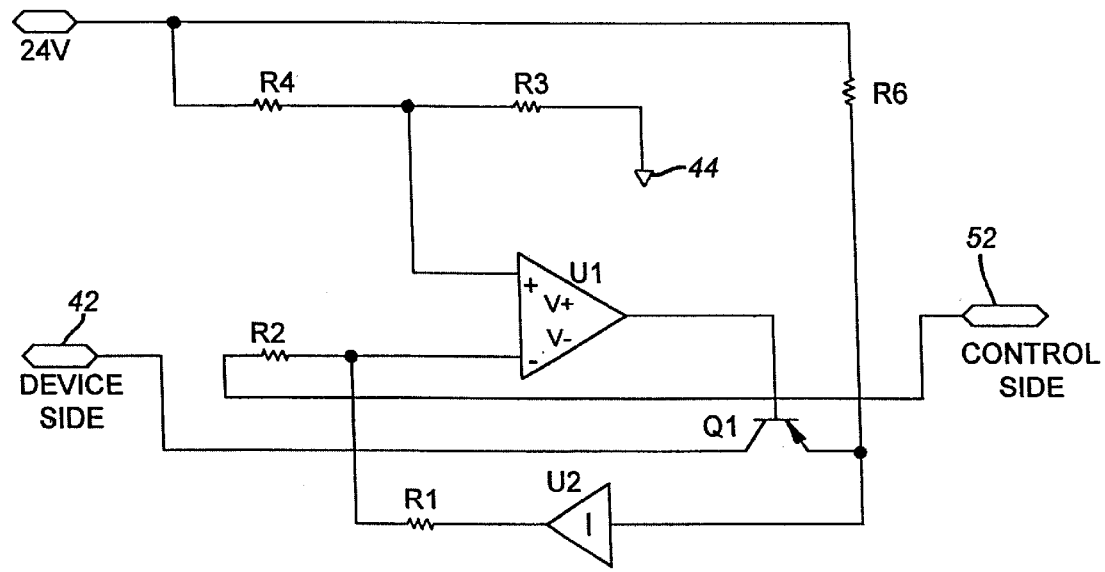

Referring next to FIG. 4D, the circuit schematic that is applicable when the analog I/O circuit 50 operates as an output circuit that receives an output current is illustrated. This mode of operation is used in conjunction with the output devices 14b and 14d. Again, the desired output status of the output devices 14b and 14d is indicated by the voltage level of the signal received at the control-side terminal 52, which is one of the inputs to the op-amp U1.

The device-side terminal 52 receives the output of the op-amp U1. The output current is related to the input $V_c$ in the following manner:

$$I_{out} = \frac{1}{R_6}\left(V_{HIGH} - \left(V_{HIGH}\frac{R_3(R_1 + R_2)}{R_2(R_3 + R_4)} - V_c\frac{R_1}{R_2}\right)\right) \quad (4)$$

where $V_c$ is a voltage signal received as an input from at the control-side terminal 52, and $I_{out}$ is the analog output control signal that is produced as an output of the transistor Q1 and that is transmitted to one of the output devices 14b and 14d. The voltage $V_{HIGH}$ is the supply voltage to the resistor $R_8$ and, in FIGS. 3B and 4D, is shown to be 24 volts. Eq. (4) may be rewritten in the following manner:

$$I_{out} = \frac{V_{HIGH}}{R_6}\left(1 - \frac{R_3(R_1 + R_2)}{R_2(R_3 + R_4)}\right) + V_c\frac{R_1}{R_6(R_2)} \quad (4a)$$

From Eq. (4a), it is seen that the output is converted to a current, is level shifted by the first term on the right-hand side of Eq. (4a), and is scaled by the second term on the right-hand side of Eq. (4a).

In the mode of operation illustrated in FIG. 4D, the op-amp U1 and the resistors R1–R4 operate as a voltage-to-voltage converter to achieve scaling and level shifting. The output of the op-amp U1 varies in accordance with the input received at the control-side terminal 52. The resistor R6 and the transistor Q1 operate as a voltage-to-current converter driven by the output voltage of the op-amp U1. The output current that flows to the output device is determined by the voltage drop across the resistor $R_6$ divided by the resistance of the resistor $R_6$. The unity gain amplifier U2 prevents feedback current through the resistor $R_1$ from loading $I_{OUT}$ and causing deviations from Eq. (4).

Although only four modes of operation have been described, it would also be possible to add additional modes of operation. For example, it may be desirable in some instances to provide different amounts of scaling and/or different level shifting for different input devices. Different amounts of scaling may be achieved by varying the value of the resistors. Additional modes of operation may be achieved by adding additional resistors and switches that achieve the desired modes of operation. It may also be desirable to add self-test modes of operation. Self-test modes could be achieved by connecting the output of the op-amp U1 to an input of a comparator. The I/O circuit 50 would then be tested by applying a test input (at either the device-side terminal 42 or the control-side terminal 52) and comparing the output voltage of the op-amp U1 to a known test reference voltage coupled to the other input of the comparator.

From the foregoing description of the I/O circuit 50, a number of advantageous features are apparent. First, the I/O circuit may be used both as an input circuit and as an output circuit. By changing the opened/closed status of the switches S1–S9, one of four different modes of operation may be selected. Moreover, it is possible to achieve these different modes of operation while using the same device-side terminal to connect the I/O circuit to a user-provided I/O device, regardless whether the I/O device is an input device or an output device. As a result, the terminal block 40 is drastically simplified, because it is not necessary to provide two different device-side terminals as well as a common terminal for each I/O channel. Rather, only a single device-side terminal is required.

Figure 5:
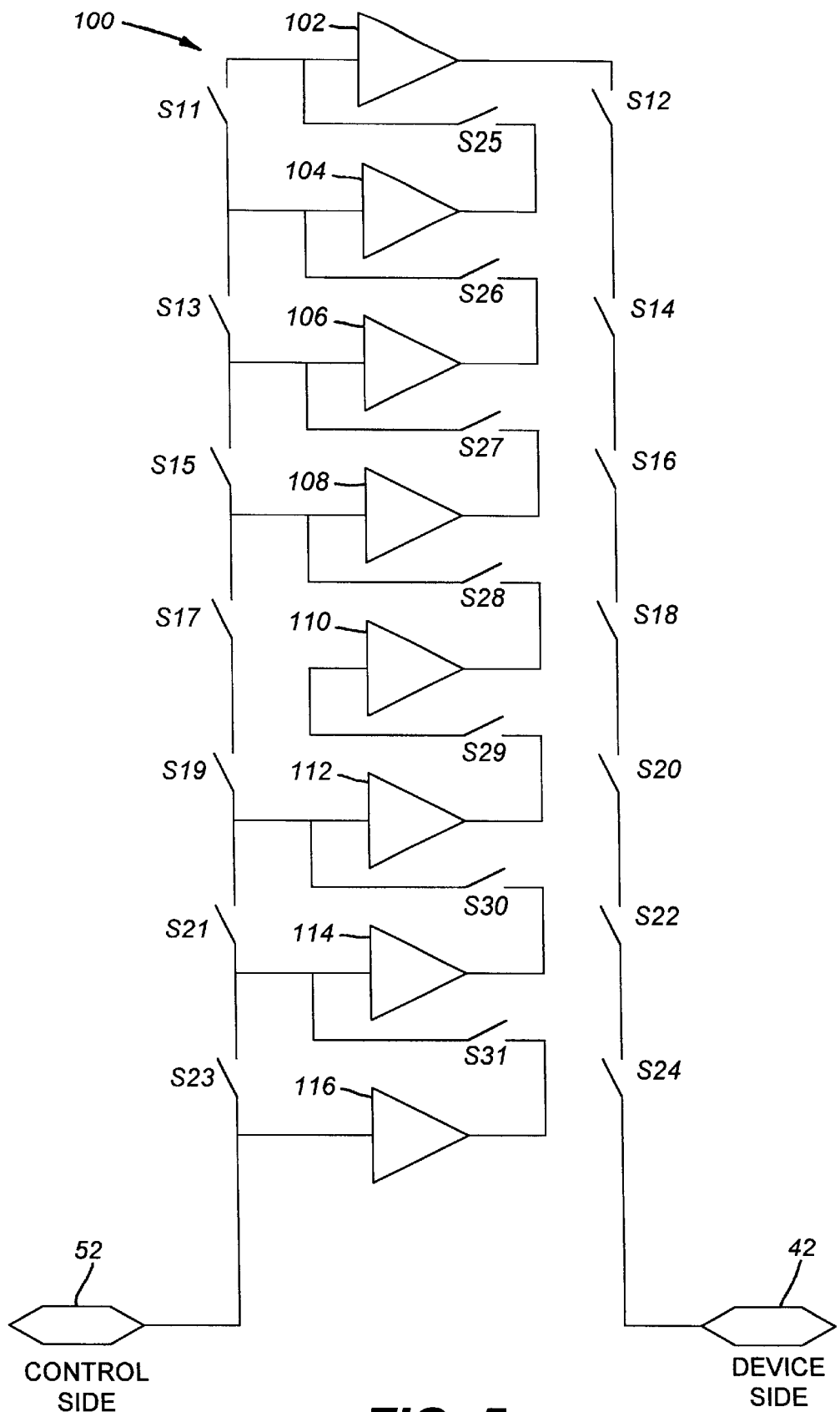
FIG. 5 is a schematic diagram of an alternative programmable I/O circuit that may be used conjunction with the industrial control system of FIG. 1.

Referring now to FIG. 5, an alternative embodiment of an I/O circuit 100 that may be used in the I/O module 18 is illustrated. The entire I/O circuit 100 shown in FIG. 5 may be implemented on a single integrated circuit. As will be detailed below, the I/O circuit 100 has an ability to switch between providing a high current/low voltage output signal and low current/high voltage output signal. This circuit arrangement is particularly useful for digital output circuits.

The I/O circuit 100 comprises a plurality of transistor circuits 102–116 and a plurality of switches S11–S31. The plurality of transistor circuits 102–116 are shown generically, however, they are preferably constructed using power transistors (preferably, metal-silicon dioxide-silicon field-effect transistors, commonly known as "MOSFETs") and associated circuitry needed to forward bias the power transistors. Although the transistors circuits 102–116 are shown to be two terminal devices (e.g., source and drain), in practice they are of course three terminal devices (e.g., gate, source and drain). The gate terminals have not been explicitly shown in FIGS. 5 and 6A–6B in order to more clearly show how the different arrangements of the transistor circuits 102–116 are achieved.

The switches S11–S31 are also shown generically, however, they are preferably micro-electromechanical switches (commonly known as "MEMS"). MEMS switches are preferred because they provide isolation between the control circuitry used to control the MEMS switches and the switched circuitry. In particular, the MEMS switches allow the terminals (e.g., gate, source and drain) of the power transistors to float. Therefore, it is possible to rearrange the configuration of the power transistors while still being able to bias them in the desired manner.

The transistor circuits 102–116 are building block gain stages which may be configured in different ways to provide different modes of operation. The transistor circuits 102–116 are configured in different ways using the switches S11–S31. The switches S11–S31 therefore implement programmable isolating links between the different transistor circuits 102–116.

Figure 6A:
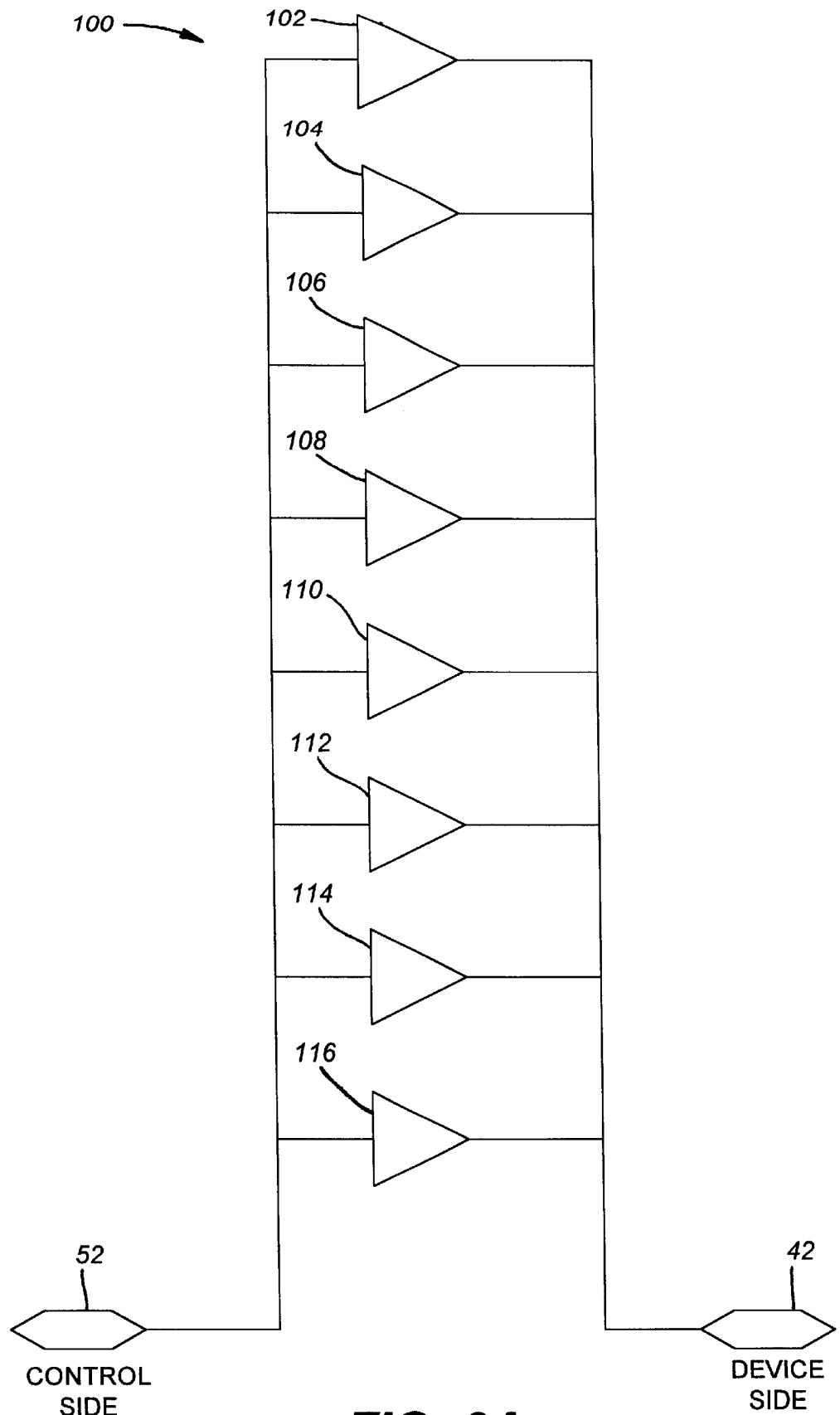
FIG. 6A–6B are schematic diagrams of the programmable I/O circuit of FIG. 5 simplified according mode of operation illustrated.
Figure 6B:
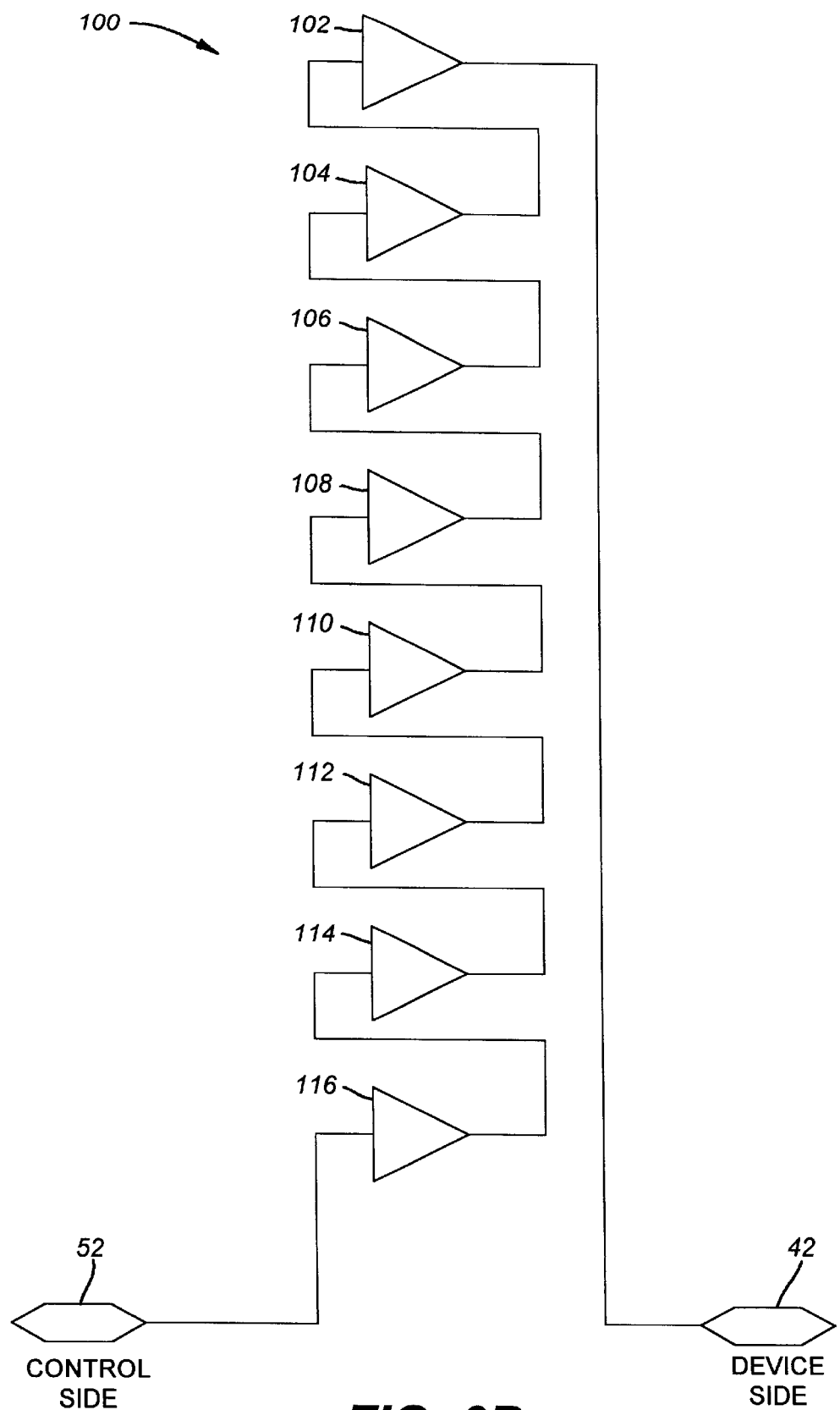

The different modes of operation will now be described in greater detail in conjunction with FIGS. 6A–6B. FIGS. 6A–6B show the same schematic as FIG. 5, however, the schematic of FIG. 5 has been simplified in accordance with the opened/closed status of the switches S11–S31. FIGS. 6A–6B do not show the switches S1–S31 but rather show the circuit that results from the switches S11–S31 being opened or closed. The open/closed position of the switches S11–S31 may be controlled using decode circuitry similar to that shown in FIG. 3B. As described, previously, the decode circuitry in turn may be controlled on the basis of hardwired switches or on the basis of configuration information received from the processor module 17.

Referring first to FIG. 6A, the circuit schematic that is applicable when the I/O circuit 100 operates as a high current/low voltage output circuit is illustrated. As shown therein, the transistor circuits 102–116 are arranged in parallel with respect to each other. Thus, the voltage that is developed between the control-side terminal 52 and the device-side terminal 42 is relatively low. However, the output circuit 100 has the ability to produce high magnitude currents.

Generally, the maximum power dissipated by each of the transistor circuits 102–116 is fixed. In particular, there is a fixed voltage maximum voltage across each transistor circuit 102–116 and a fixed maximum current through each transistor circuit 102–116. When the transistor circuits 102–116 are placed in parallel, the voltage drop across the I/O circuit 100 is equal to the voltage drop across one of the transistor circuits 102–116. The voltage drop across each of the transistor circuits 102–116 is in parallel with the voltage drop produced across the remainder of the transistor circuits 102–116, and there is no additive effect. However, the current produced by the I/O circuit 100 is the sum of the current produced by each of the individual transistor circuits 102–116.

Referring now to FIG. 6B, the circuit schematic that is applicable when the I/O circuit 100 operates as a low current/high voltage output circuit is illustrated. As shown therein, the transistor circuits 102–116 are arranged in series with respect to each other. Thus, the voltage that is developed between the control-side terminal 52 and the device-side terminal 42 is high as compared with the arrangement of FIG. 6A. However, the output circuit 100 in FIG. 6B produces lower magnitude currents as compared with the arrangement of FIG. 6A.

When the transistor circuits 102–116 are placed in series, the voltage drop across the I/O circuit 100 is equal to the sum of the voltage drops across each one of the transistor circuits 102–116. The voltage drop across each of the transistor circuits 102–116 is in series with the voltage drop produced across the remainder of the transistor circuits 102–116, and there is an additive effect. However, the current produced by the I/O circuit 100 is equal to the current through an individual one of the transistor circuits 102–116. Thus, with respect to current, there is no additive effect. Therefore, the arrangement in FIG. 6B results in a higher voltage but a lower current as compared to the arrangement in FIG. 6A. In both arrangements, the total power dissipated is the same, since the number of transistor circuits 102–116 utilized is the same.

Of course, intermediate arrangements are also possible by adding more switches. For example, the transistor circuits 102–108 could be placed in parallel with each other as a group, the transistor circuits 110–116 could be placed in parallel with each other as a group, and the group of transistor circuits 102–108 and the group of transistor circuits 110–116 could be placed in series with each other.

Advantageously, therefore, the I/O circuit 100 has the ability to provide both a high current/low voltage output signal and a low current/high voltage output signal. Thus, the I/O circuit can drive output devices that require a high current/low voltage output signal as well as other output devices that require a low current/high voltage output signal.

Figure 7A:
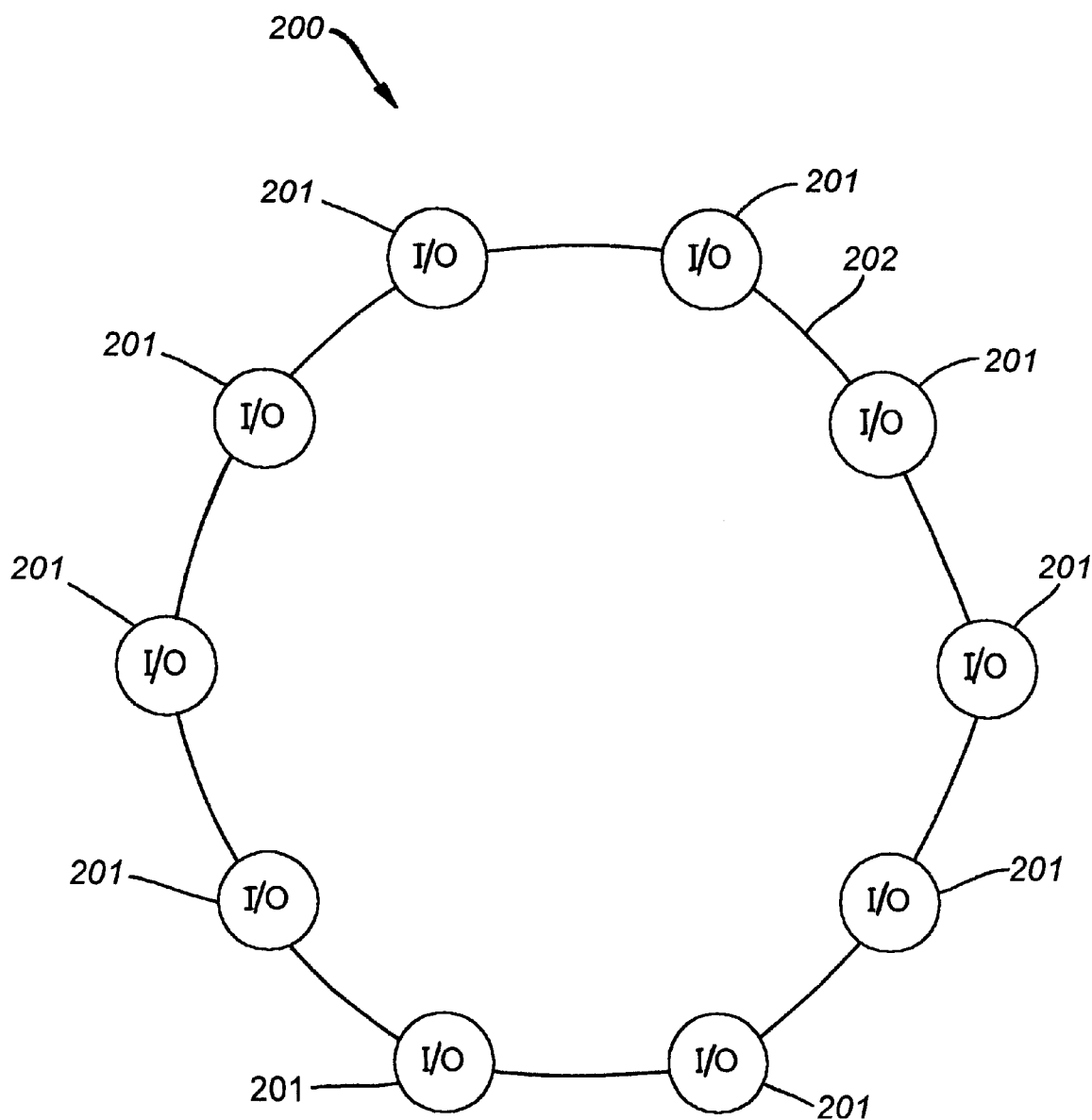
FIG. 7A is another industrial control system that utilizes programmable I/O circuits.
Figure 7B:
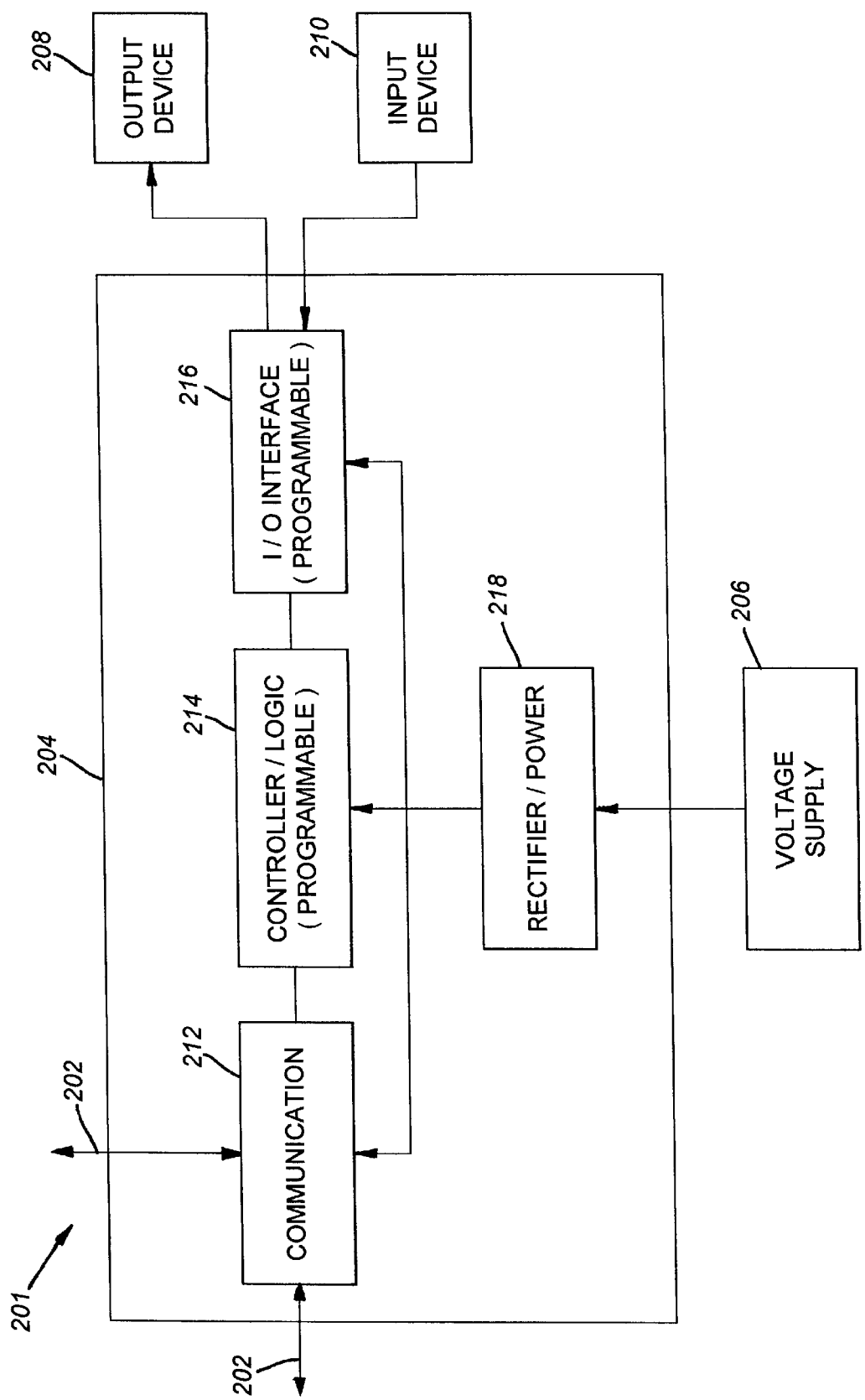
FIG. 7B is one of the intelligent I/O nodes in the industrial control system of FIG. 7A, according to another embodiment of the invention.

Referring now to FIGS. 7A–7B, another industrial control system 200 that utilizes programmable analog I/O circuits is illustrated. The industrial control system 200 is a highly distributed control system in which control functionality is located with the I/O devices. Thus, as illustrated in FIG. 7A, the system 200 comprises a plurality of intelligent I/O nodes 201 without any form of centralized control. The intelligent I/O nodes 201 are connected to each other by way of a communication network 202.

Preferably, the number of input and output devices at each intelligent I/O node 201 is relatively small. In particular, each intelligent I/O node 201 preferably comprises between one and two output devices and/or between one and five input devices. Ideally, for the highest level of control granularity, each intelligent I/O node 201 comprises only one input device and/or one output device. For example, a given intelligent I/O node 201 may consist essentially of a solenoid and a control and I/O circuit (FIG. 7B) that permits the solenoid to communicate intelligently with other I/O devices in the system 200. The control and I/O circuit may then be provided in the form of an application-specific integrated circuit (ASIC) which is manufactured and sold as an integral part of the solenoid. Other intelligent I/O nodes 201 may be formed of similar types of output devices constructed with an integrally provided control and I/O circuit 204, such as relays, motor, lamp indicators, and so on. Likewise, some of the intelligent I/O nodes 201 may be formed of input devices that are constructed with an integrally provided control and I/O circuit 204, such as photoelectric sensors, proximity sensors, switches (e.g., pushbutton switches, rotating cam switches, speed switches, limit switches), encoders, resolvers, and tachometers. (In some cases, a given physical device may constitute several I/O devices, for example, a motor with encoder feedback is both an output device and an input device.) The resulting industrial control system 200 is therefore a highly distributed control system, since the control logic associated with each I/O device is distributed all the way to the device level.

FIG. 7B illustrates an individual one of the intelligent I/O nodes 201. The intelligent I/O node 201 comprises a control and I/O circuit 204, a voltage supply 206, one or more input devices 208, and one or more output devices 210. The control and I/O circuit 204 further includes a communication interface 212, a control/logic section 214 an I/O interface 216 and a rectifier/power section 218. As previously noted, the control and I/O circuit 204 may be provided in the form of a single ASIC.

The communication interface 212 connects the control and I/O circuit 204 to the communication network 202. Therefore, the communication interface 212 may be used to permit communication between the intelligent I/O node 201 illustrated in FIG. 7B and the remaining intelligent I/O nodes 201 illustrated in FIG. 7A. Additionally, the communication interface 212 may be used to download configuration information for the control/logic section 214 and the I/O interface 216 (both of which are programmable).

The power/rectifier section 218 provides power conditioning necessary to operate the circuit 204. In this regard, it may be noted that some communication networks include a power connection (e.g., a 24 volt power connection). Assuming the communication network 202 is constructed in this manner, then the power/rectifier section 218 is used to convert the voltage provided by the communication network 202 into a voltage that is usable by the circuit 202.

The control/logic section 214 is preferably implemented using non-volatile memory and a microprocessor (not illustrated). The control/logic section 214 is programmable and may be programmed using the communication interface 212 to download configuration information. The configuration information is stored in the non-volatile memory. The control/logic section 214 may be used to implement either Boolean or closed loop control, and could also incorporate other features such as self-tuning algorithms in situations where the controlled process changes with time (e.g., a self-tuning algorithm to compensate for wearing of a tool used in a controlled process).

The I/O interface 216 is programmable and may be implemented using, for example, the I/O circuit 50 and/or the I/O circuit 100 discussed above. The mode selection is performed by the control/logic section 214. The I/O interface 216 is programmable so that the control and I/O circuit 204 can be used in conjunction with different I/O devices having differently formatted I/O signals.

In operation, the intelligent I/O node 201 monitors the status of I/O devices at other nodes in the control system 200 using the communication interface 212 and the communication network 202. Often, it will be sufficient for the node 201 to query the status of only one input at another intelligent I/O node 201 in the control system 200. The intelligent I/O node 201 then controls the output device 208 in accordance with conditions at other locations in the system 200. Therefore, substantially all of the control occurs at the device level (although provision could also be made for high level control, e.g., user interaction with the system 200). Coordination of the individual nodes 201 occurs through a time base that is built into the communication network 202. Alternatively, if a communication network is utilized that does not have a built-in time base, one of the nodes 201 could be a real-time clock.

Advantageously, therefore, the industrial control system 200 is a highly distributed control system in which control is distributed all the way to the device level. This arrangement is achieved through the use of the control and I/O circuit which is preferably a completely self-contained integrated circuit that can be used to provide highly intelligent I/O devices. The control and I/O circuit is very flexible because it can be used to implement a variety of different control functions and can be used in conjunction with a variety of different I/O devices.

Many other changes and modifications may be made to the present invention without departing from the spirit thereof. The scope of these and other changes will become apparent from the appended claims.

What is claimed is:

1. An industrial control system comprising:
   (A) a communication network;
   (B) a plurality of intelligent I/O nodes, the plurality of intelligent I/O nodes being coupled to each other by way of the communication network, the plurality of intelligent I/O nodes each comprising an integrated circuit fabricated on a single semiconductor chip and at least one of a mechanical input device and a mechanical output device integrally packaged with the semiconductor chip, at least one of the plurality of intelligent I/O nodes comprising a mechanical output device and at least one of the plurality of intelligent I/O nodes comprising a mechanical input device, each respective intelligent I/O node that comprises a mechanical output device querying remaining intelligent I/O nodes and, on the basis of the querying, controlling the mechanical output device within the respective intelligent I/O node; and
   wherein the industrial control system is substantially entirely controlled by the control/logic circuits associated with each of the plurality of intelligent I/O nodes, such that there is substantially no centralized control.

2. An industrial control system according to claim 1, wherein the at least one intelligent I/O node that is coupled to a mechanical output device comprises an integrated circuit fabricated on a single semiconductor chip, the integrated circuit comprising:
   an I/O interface, the I/O interface being programmable, and the I/O interface being coupled to the mechanical output device;
   a control logic circuit, the control/logic circuit being programmable, and the control/logic circuit controlling the I/O interface to thereby control the mechanical output device;
   a communication interface, the communication interface being adapted for being connected to a communication network (1) to receive information usable to program the I/O interface and the control/logic circuit, and (2) to permit the control/logic circuit to control the I/O interface on the basis of I/O status information received from other I/O devices by way of the communication network.

3. An industrial control system according to claim 2, wherein the mechanical output device is one of a relay, a solenoid, and a motor.

4. An industrial control system according to claim 3, wherein the mechanical input device is one of a pushbutton switch, a rotating cam switch, a speed switch, a limit switch, an encoder, a resolver, and a tachometer.

5. An industrial control system according to claim 1, wherein each of the plurality of intelligent I/O nodes comprises at most two output devices and at most five input devices.

6. An industrial control system according to claim 1 wherein, for at least one of the plurality of I/O nodes, the number of I/O devices is equal to one.

7. An industrial control system according to claim 1, further comprising an additional I/O node that comprises more than a small number of input and output devices.

8. An industrial control system according to claim 1, wherein each of the plurality of intelligent I/O nodes comprises at most two I/O devices.

9. An industrial control system comprising:
   (A) a communication network;
   (B) a plurality of intelligent I/O nodes, the plurality of intelligent I/O nodes being coupled to each other by way of the communication network, the plurality of intelligent I/O nodes each comprising an integrated circuit fabricated on a single semiconductor chip and at least one of a mechanical input device and a mechanical output device integrally packaged with the semiconductor chip, at least one of the plurality of intelligent I/O nodes comprising an analog mechanical output device and at least one of the plurality of intelligent I/O nodes comprising an analog mechanical input device, each respective intelligent I/O node that comprises an analog mechanical output device querying remaining intelligent I/O nodes and, on the basis of the querying, controlling the analog mechanical output device within the respective intelligent I/O node, the integrated circuit of the at least one intelligent I/O node comprising the analog mechanical output device further comprising (1) an I/O interface, the I/O interface being programmable, and the I/O interface being coupled to the analog mechanical output device, the I/O interface having first and second modes of operation, the first mode of operation being as an input circuit, and the second mode of operation being as an output circuit, and the I/O interface including (a) a device-side I/O terminal, (i) wherein, in the first mode of operation, the device-side I/O terminal is adapted for receiving an analog input status signal from an analog mechanical input device, the analog input status signal indicating an input status of the analog mechanical input device, and (ii) wherein, in the second mode of operation, the device-side I/O terminal is adapted for transmitting an analog output control signal to the analog mechanical output device, the analog output control signal indicating a desired output status of the analog mechanical output device, and (b) signal conditioning circuitry, the signal conditioning circuitry being coupled to the device-side I/O terminal, (i) wherein, in the first mode of operation, the signal conditioning circuitry receives the analog input status signal as an input, and (ii) wherein, in the second mode of operation, the signal conditioning circuitry produces the analog output control signal as an output, (2) a control/logic circuit, the control/logic circuit being programmable, and the control/logic circuit controlling the I/O interface to thereby control the analog mechanical output device, and (3) a communication interface, the communication interface being adapted for being connected to a communication network (a) to receive information usable to program the I/O interface and the control/logic circuit, and (b) to permit the control/logic circuit to control the I/O interface on the basis of I/O status information received from other I/O devices by way of the communication network; and wherein the industrial control system is substantially entirely controlled by the control/logic circuits associated with each of the plurality of intelligent I/O nodes, such that there is substantially no centralized control.

10. An industrial control system according to claim 9, wherein the I/O interface further comprises a control-side I/O terminal, the control-side I/O terminal being coupled to the signal conditioning circuitry, (1) wherein, in the first mode of operation, the control-side I/O terminal receives an output of the signal conditioning circuitry, the output of the signal conditioning circuitry being produced by the signal conditioning circuitry based upon the analog input status signal, and (2) wherein, in the second mode of operation, the control-side I/O terminal provides an input to the signal conditioning circuitry, the input to the signal conditioning circuitry being used by the signal conditioning circuitry to produce the analog output control signal.

11. An industrial control system according to claim 10, wherein the signal conditioning circuitry comprises an operational amplifier, the operational amplifier receiving the analog input status signal as an input in the first mode of operation and producing the analog output control signal as an output in the second mode of operation.

12. An industrial control system according to claim 10, wherein the signal conditioning circuitry comprises an operational amplifier, the operational amplifier having an output and an input that are both capable of being selectively coupled to either the device-side I/O terminal or to the control side I/O terminal;

wherein, in the first mode of operation, the output of the operational amplifier is coupled to the control-side I/O terminal and the input of the operational amplifier is coupled to the device-side I/O terminal; and wherein, in the second mode of operation, the output of the operational amplifier is coupled to the device-side I/O terminal and the input of the operational amplifier is coupled to the control-side I/O terminal.

13. An industrial control system according to claim 9, wherein the I/O interface further has third and fourth modes of operation, the third mode of operation being as an input circuit, and the fourth mode of operation being as an output circuit; and (1) wherein, in the first mode of operation, the analog input status signal is a first voltage signal having a first voltage level that indicates the input status of the analog mechanical input device and, based on the analog input status signal, the signal conditioning circuitry produces a second voltage signal having a second voltage level that indicates the input status of the analog mechanical input device, the second voltage signal having a different range of possible voltage levels than the first voltage signal, (2) wherein, in the second mode of operation, the analog output control signal is a first voltage signal having a first voltage level that indicates a desired output status of the analog mechanical output device and, to produce the analog output control signal, the signal conditioning circuitry uses a second voltage signal having a second voltage level that indicates the desired output status of the analog mechanical output device, the second voltage signal having a different range of possible voltage levels than the first voltage signal, (3) wherein, in the third mode of operation, the analog input status signal is a current signal having a current level that indicates the input status of the analog mechanical input device and, based upon the analog input status signal, the signal conditioning circuitry produces a voltage signal having a voltage level that indicates the input status of the analog mechanical input device, and (4) wherein, in the fourth mode of operation, the analog output control signal is a current signal having a current level that indicates the desired output status of the analog mechanical output device and, to produce the analog output control signal, the signal processing circuitry uses a voltage signal having a voltage level that indicates a desired output status of the analog mechanical output device.

14. An industrial control system comprising:

(A) a communication network;

(B) a plurality of intelligent I/O nodes, the plurality of intelligent I/O nodes being coupled to each other by way of the communication network, the plurality of intelligent I/O nodes each comprising an integrated circuit fabricated on a single semiconductor chip and at least one of a mechanical input device and a mechanical output device integrally packaged with the semiconductor chip, at least one of the plurality of intelligent I/O nodes comprising a mechanical output device and at least one of the plurality of intelligent I/O nodes comprising a mechanical input device, each respective intelligent I/O node that comprises a mechanical output device querying remaining intelligent I/O nodes and, on the basis of the querying, controlling the mechanical output device within the respective intelligent I/O node, the integrated circuit of the at least one intelligent I/O node that comprises the mechanical output device further comprising (1) a programmable I/O interface, the programmable I/O interface comprising (a) a plurality of configurable gain stages, and (b) a plurality of programmable isolating links, the plurality of programmable isolating links being coupled to the plurality of configurable gain stages, the plurality of programmable isolating links being programmable to determine an arrangement of the plurality of configurable gain stages, and wherein the plurality of configurable gain stages are adapted for being configured in first and second arrangements, wherein, in the first arrangement, the plurality of configurable gain stages are arranged in series so as to provide a first output control signal, wherein, in the second arrangement, the plurality of configurable gain stages are arranged in parallel so as to provide a second output control signal, wherein, the first output control signal is a low current, high voltage output signal as compared to the second output control signal and the second output control signal is a high current, low voltage output signal as compared to the first output control signal, (2) a control/logic circuit, the control/logic circuit being programmable, and the control/logic circuit controlling the I/O interface to thereby control the mechanical output device, and (3) a communication interface, the communication interface being adapted for being connected to a communication network (a) to receive information usable to program the I/O interface and the control/logic circuit, and (b) to permit the control/logic circuit to control the I/O interface on the basis of I/O status information received from other I/O devices by way of the communication network; and wherein the industrial control system is substantially entirely controlled by the control/logic circuits associated with each of the plurality of intelligent I/O nodes, such that there is substantially no centralized control.

15. An industrial control system according to claim 14, wherein the plurality of programmable isolating links each comprise a micro-electromechanical switch.

16. An industrial control system according to claim 14, further comprising an additional plurality of configurable gain stages and an additional plurality of programmable isolating links.

17. An industrial control system according to claim 14, wherein the plurality of configurable gain stages each comprise a metal-silicon dioxide-silicon field-effect transistor.

* * * * *